Patented May 30, 1933

1,911,534

UNITED STATES PATENT OFFICE

EIJI SATAKE, OF YANAGI-DORI, NISHINARI-KU, OSAKA, JAPAN

METHOD OF TREATING KAOLIANG

No Drawing. Application filed June 21, 1932. Serial No. 618,477.

This invention relates to a method of removing the bran, embryo bud and inside skin from kaoliang, and the object thereof is to clean kaoliang hitherto considered very difficult by removing its bran and inside skin easily and perfectly by simple means and also to obtain as by-products the bran suitable as the food for the cattle, the inside skin for use as the raw material for the cake and other kinds of food, and the embryo bud used as the raw material for kaoliang oil.

Now, there are many methods for the removal of the bran from kaoliang, for instance, by using alkali and other chemicals or mixing mineral powder such as clay, kaolin, etc. with kaoliang. However, the bran obtained as by-product by such methods is not only unfit as the food for the cattle, but also owing to the inability to remove the embryo bud it is entirely impossible to separate the oil which would have been obtained from it. According to the present invention it is possible to obtain the food for the cattle and the raw material for the cake and other kinds of food by removing the bran and inside skin from kaoliang easily and perfectly by simple means, and at the same time to collect the embryo bud to extract oil from it. Thus, it is possible to treat kaoliang quite economically.

The essential feature of this invention consists in steeping kaoliang in tepid water until its bran and inside skin becomes slightly soft; taking it out and mixing therewith the dried bran obtained by the previous treatment, so that each grain may be coated with the said bran to have the water around it absorbed by the latter; directly separating the above bran which has absorbed the water, from the grain by means of a winnower; passing the grain at once between the fixed wire net and moving rubber face to receive friction and thus remove the bran, embryo bud and then inside skin.

Generally, kaoliang grain is covered with the husk, resembling a black cap-like calyx and then a bran and inside skin. These bran and inside skin have both deep brown color and astringent taste and are difficult to be removed by the ordinary pounding method. Especially, the embryo bud of kaoliang sticking to the endosperm, is hard to be removed even by the treatment with chemicals and other treatments. According to this invention it is possible to separate the bran, inside skin and embryo bud easily and perfectly.

The following is an example of carrying out this invention into practice:—

Firstly, remove the husk from kaoliang, and shifting the grains with a sieve directly, divide them into the grains of big, medium and small sizes. Next, steep them separately in lukewarm water for about half an hour to loosen their brans, inside skins and embryo buds. Take them out and mix therewith about 10 to 20% of the completely-dried bran of kaoliang obtained in the previous operation and stir them, so that each of them may be coated with the bran. In the above operation, the layer of the powdered bran containing a large quantity of protein covers the grain and presents the appearance of a thick rubber skin, while the part close to the endosperm becomes easily separable. Thus, after coating the grain with the powdered bran, remove an excess of the bran with a winnower at once. Then, the bran is separated by subjecting the above treated grain to friction by passing it between the rubber face and wire net of a grinding machine which has a rubber board or roller at the upper part and the fixed wire net opposite it at the lower part, the said rubber board or roller being so constructed as to rotate. In this way, the separated bran will fall down through the meshes of the wire net. By repeating such operation several times the cleaned kaoliang can be obtained. The bran separated containing embryo bud, winnow the latter from the former, so that a part of the bran may be dried and used again, while the other part is used to feed the cattle. The embryo bud makes the raw material for kaoliang oil; and the bran and inside skin, the raw material for the cake and other kinds of food.

I claim:

Method of treating kaoliang, which consists in steeping the grain of kaoliang in lukewarm water till its bran and inside skin become slightly soft; taking it out and mixing therewith the dried bran of kaoliang and stirring it, so that each gran may be coated with the said bran; removing an excess of the bran at once; and then passing the said grain between the fixed wire net and the moving rubber face to receive friction and thereby remove the bran, embryo bud and then inside skin.

In testimony whereof I have signed my name to this specification.

EIJI SATAKE.